(12) United States Patent
Chen

(10) Patent No.: US 9,018,855 B2
(45) Date of Patent: *Apr. 28, 2015

(54) CONTROLLING CIRCUIT FOR AN LED DRIVER AND CONTROLLING METHOD THEREOF

(71) Applicant: Silergy Semiconductor Technology (Hangzhou) Ltd, Hangzhou, ZheJiang Province (CN)

(72) Inventor: Shenglun Chen, Hangzhou (CN)

(73) Assignee: Silergy Semiconductor Technology (Hangzhou) Ltd., Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/277,375

(22) Filed: May 14, 2014

(65) Prior Publication Data

US 2014/0246988 A1 Sep. 4, 2014

Related U.S. Application Data

(63) Continuation-in-part of application No. 13/329,614, filed on Dec. 19, 2011, now Pat. No. 8,773,047.

(30) Foreign Application Priority Data

Dec. 30, 2010 (CN) .......................... 2010 1 0619845

(51) Int. Cl.
*G05F 1/00* (2006.01)
*H05B 33/08* (2006.01)
*H02M 3/335* (2006.01)

(52) U.S. Cl.
CPC ....... *H05B 33/0815* (2013.01); *H02M 3/33523* (2013.01)

(58) Field of Classification Search
USPC ............ 315/291, 307, 223, 224, 200 R, 254, 315/232, 284
See application file for complete search history.

(56) References Cited

U.S. PATENT DOCUMENTS

| 7,259,972 | B2* | 8/2007 | Yang .......................... 363/21.16 |
| 8,773,047 | B2* | 7/2014 | Chen ............................ 315/308 |
| 2006/0066264 | A1 | 3/2006 | Ishigaki et al. |
| 2007/0252535 | A1 | 11/2007 | Fukumoto et al. |
| 2009/0058318 | A1 | 3/2009 | Fukui et al. |
| 2010/0039048 | A1 | 2/2010 | Liu et al. |
| 2010/0039081 | A1 | 2/2010 | Sip |

(Continued)

FOREIGN PATENT DOCUMENTS

CN 201590919 U 9/2010

*Primary Examiner* — Minh D A
(74) *Attorney, Agent, or Firm* — Michael C. Stephens, Jr.

(57) ABSTRACT

The present invention relates to a controlling circuit and controlling method for an LED driver implemented as a flyback topology. The controlling circuit may be at a primary side of a transformer of the LED driver, and include a sampling circuit, an on time sensing circuit of an output diode, a regulating signal generator, and a PWM controller. The sampling circuit may generate a sampling signal indicating output current by sampling at the primary transformer side. The on time sensing circuit can detect an on time of the output diode. The regulating signal generator can generate a regulating signal by regulating the sampling signal, a voltage reference, and the on time of the output diode. The PWM controller may generate a controlling signal to control operation of a switching device of the LED driver to maintain a substantially constant output current in accordance with the regulating signal.

20 Claims, 12 Drawing Sheets

(56) References Cited

U.S. PATENT DOCUMENTS

| | | |
|---|---|---|
| 2010/0079081 A1 | 4/2010 | Zhang et al. |
| 2010/0244726 A1 | 9/2010 | Melanson |
| 2010/0295470 A1 | 11/2010 | Koutensky |

\* cited by examiner

CONTROLLING CIRCUIT FOR AN LED DRIVER AND CONTROLLING METHOD THEREOF

RELATED APPLICATIONS

This application is a continuation-in-part of the following application, U.S. patent application Ser. No. 13/329,614, filed on Dec. 19, 2011, now issued as a U.S. Pat. No. 8,773,047, and which is hereby incorporated by reference as if it set forth in full in this specification, and which also claims the benefit of Chinese Patent Application No. 201010619845.0, filed on Dec. 30, 2010, which is incorporated herein by reference in its entirety.

FIELD OF THE INVENTION

The present invention generally pertains to electronic circuits, and more particularly to a controlling circuit and method of controlling driver for a light emitting diode (LED).

BACKGROUND

With rapid development and continuous innovation in the lighting industry, and the growing importance of energy savings and environmental protection, LED lighting rapidly developed as an important lighting technology. However, the luminance of LED lighting (associated with the parameter of luminance intensity) is in direct proportion with the current and forward voltage drop of the LED, and is also varied with temperature. Therefore, a constant current generator may be necessary to drive the LED. Conventional constant current typically use an optical coupler, voltage reference, and sensing circuit as part of an output regulating circuit.

However, such conventional constant current generators have several drawbacks. For example, optical coupler may deteriorate over time, and the transfer ratio of current may decay, resulting in a disadvantageous effect on the stability and life for some applications. Also, increased space may be occupied, resulting in increased costs due to the large number of devices, which also may result in relatively low reliability. Further, the sensing circuit usage may result in increased power loss and lower efficiency. Therefore, conventional LED drivers may not meet the needs of smaller size, higher efficiency, and increased energy savings.

SUMMARY

In view of the above-mentioned limitations, particular embodiments may provide a primary sided controlling circuit and controlling method that employs a direct sampling signal of primary side of the transformer to simplify the circuit structure and improve the efficiency.

In one embodiment, a controlling circuit for a light-emitting diode (LED) driver may include a transformer, an output diode arranged at a secondary side of the transformer, and a switching device arranged at a primary side of the transformer to form a flyback topology, where the controlling circuit is arranged at the primary side of the transformer. The controlling circuit can include: (i) a sampling circuit configured to generate a sampling signal that indicates an output current signal of the LED driver at the primary side of the transformer; (ii) an on time sensing circuit configured to sense an on time of the output diode; (iii) a regulating signal generator configured to regulate the sampling signal, a voltage reference that is directly proportional to an expected output current of the LED driver, and the on time of the output diode, where the sampling signal and the on time of the output diode are in direct proportion with the voltage reference and in inverse proportion with a switching cycle, and where the regulating signal generator is configured to generate a regulating signal; and (iv) a pulse-width modulation (PWM) controller configured to generate a controlling signal to control operation of the switching device of the LED driver based on the regulating signal to maintain a substantially constant output current of the LED driver.

In one embodiment, a controlling method for an LED driver configured in a flyback topology, can include: (i) sampling current flowing through a primary side of a transformer of the LED driver by a sensing resistor arranged in series with a switching device at the primary side of the LED driver, and generating a sensing voltage signal in response thereto; (ii) sampling and holding the sensing voltage signal to obtain a peak value of the sensing voltage signal; (iii) generating an averaging signal from the peak value of the sensing voltage signal, a voltage reference, and an on time of output diode of the LED driver; (iv) generating a regulating signal by compensating the averaging signal; and (v) generating a controlling signal based on the regulating signal to control operation of the switching device of the LED driver to maintain a substantially constant output current.

In one embodiment, a controlling method for an LED configured in a flyback topology, can include: (i) sampling current flowing through a primary side of a transformer of the LED driver by a sensing resistor arranged in series with a switching device at the primary side of the LED driver, and generating a sensing voltage signal in response thereto; (ii) averaging the sensing voltage signal in accordance with an on time of an output diode and a switching cycle to generate an averaging signal; (iii) calculating an error between the averaging signal and a voltage reference to generate an error signal; (iv) generating a regulating signal by compensating the error signal; and (v) generating a controlling signal to control operation of a switching device of the LED driver based on the regulating signal to maintain a substantially constant output of the LED driver.

Embodiments of the present invention can advantageously provide several advantages over conventional approaches, due to only the primary side of the transformer being employed without an optical coupler and output sensing circuit of the feedback loop. For example, the stability and operating life may be increased due to the non-participation of an optical coupler. In addition, less space, lower cost, and higher reliability can be achieved due to using fewer devices, and higher efficiency may be achieved as a result. Other advantages of the present invention will become readily apparent from the detailed description of preferred embodiments below.

DETAILED DESCRIPTION

Figure 1:
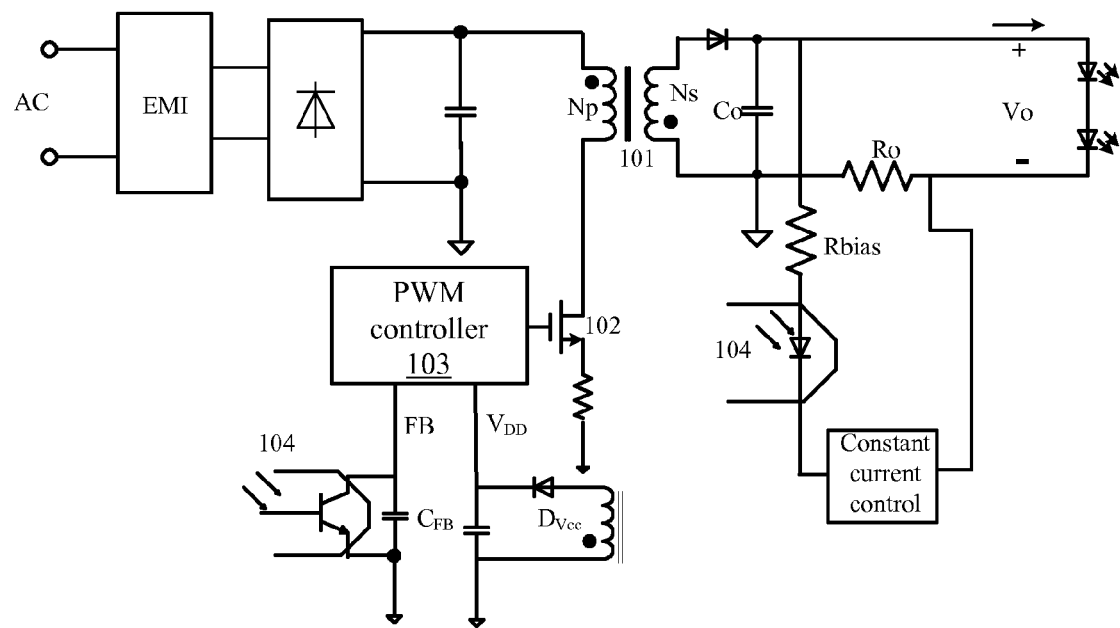
FIG. 1 is a schematic diagram of a conventional LED driver employing secondary sided controlling scheme.

Reference will now be made in detail to particular embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it will be readily apparent to one skilled in the art that the present invention may be practiced without these specific details. In other instances, well-known methods, procedures, processes, components, structures, and circuits have not been described in detail so as not to unnecessarily obscure aspects of the present invention.

Some portions of the detailed descriptions which follow are presented in terms of processes, procedures, logic blocks, functional blocks, processing, schematic symbols, and/or other symbolic representations of operations on data streams, signals, or waveforms within a computer, processor, controller, device and/or memory. These descriptions and representations are generally used by those skilled in the data processing arts to effectively convey the substance of their work to others skilled in the art. Usually, though not necessarily, quantities being manipulated take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

Furthermore, in the context of this application, the terms "wire," "wiring," "line," "signal," "conductor," and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Embodiments of the present invention can advantageously provide several advantages over conventional approaches, due to only the primary side of the transformer being employed without an optical coupler and output sensing circuit of the feedback loop. For example, the stability and operating life may be increased due to the non-participation of an optical coupler. In addition, less space, lower cost, and higher reliability can be achieved due to using fewer devices, and higher efficiency may be achieved as a result. The invention, in its various aspects, will be explained in greater detail below with regard to exemplary embodiments.

Referring now to FIG. 1, a schematic diagram of a conventional off line light-emitting diode (LED) driver with constant current controlling scheme is depicted. In this example, an isolated flyback converter may include transformer 101, power switching device 102, pulse-width modulation (PWM) controller 103, and optical coupler 104, as well as an additional regulating circuit for the output current.

To maintain the output current of the LED driver to a substantially constant predetermined value under varied conditions, the output voltage of the secondary side of transformer 101 may be detected, and then compared against a voltage reference to generate an error signal. The error signal may then be transferred to the PWM controller 103 at the primary side of transformer 101 by optical coupler 104, and then used to control the duty cycle of power switching device 102. The output current can recover to the initial predetermined value by way of the control for operation of power switching device 102 implemented by the controlling circuit at the primary side, in spite of variations of the output current of LED driver.

However, the optical coupler may deteriorate over time, and the transfer ratio of current may decay, resulting in a disadvantageous effect on the stability and life for some applications. Also, increased space may be occupied by the circuit of FIG. 1, resulting in increased costs due to the relatively large number of devices, which also may result in relatively low reliability. Further, the sensing circuit usage may result in increased power loss and lower efficiency. Therefore, LED drivers as shown in the particular example of FIG. 1 may not meet the needs of smaller size, higher efficiency, and increased energy savings.

Figure 2:
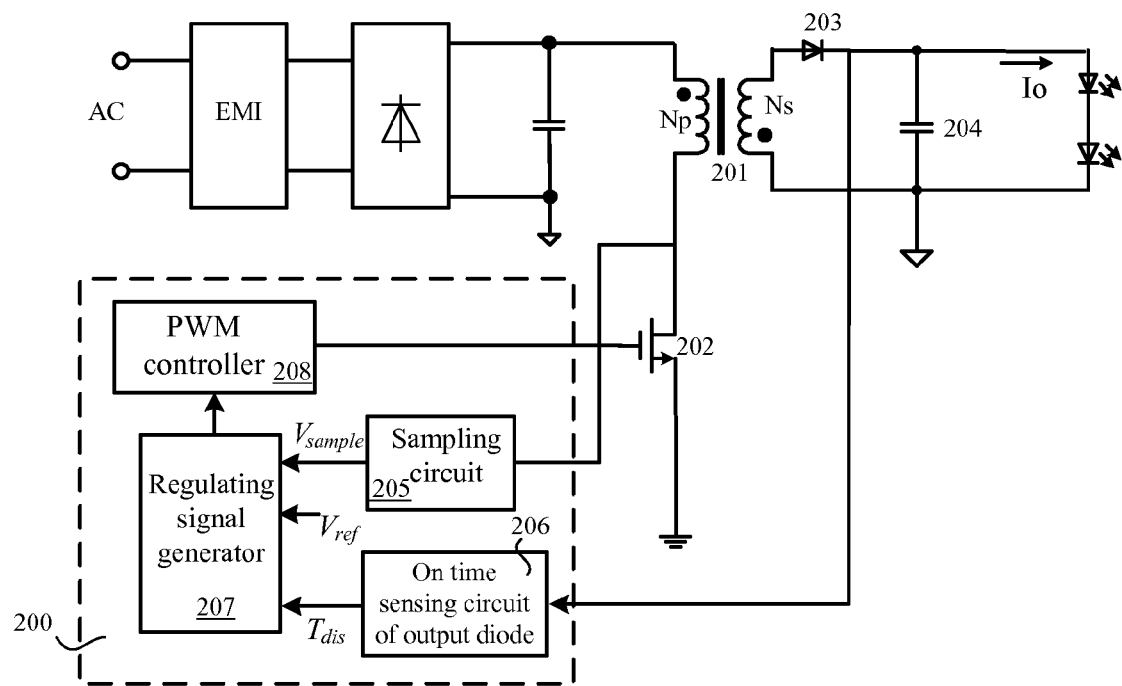
FIG. 2 is a schematic diagram of a first example controlling circuit of an LED driver in accordance with embodiments of the present invention.

Referring now to FIG. 2, an example controlling circuit for an LED driver in accordance with embodiments of the present invention is shown. This particular example shows a flyback topology implementation, but other topologies are also accommodated in particular embodiments. In this example, an external AC input voltage may be received by an electromagnetic interference (EMI) circuit and a rectifier bridge and/or power factor correction (PFC), and then be transferred to the primary side (Np) of transformer 201.

Switching device 202 may be coupled to the primary winding of transformer 201, and controlled by controlling circuit 200. Output diode 203 and output capacitor 204 can be coupled the secondary winding (Ns) of transformer 201, in order to provide a substantially constant output current to drive the LED. Controlling circuit 200 can include sampling circuit 205 arranged at the primary side of transformer 201 to sample the current information at the primary side. Controlling circuit 200 can also include on time sensing circuit of output diode 206 at the secondary side of transformer 201 to sense the on time of output diode 203.

Controlling circuit 200 can also include regulating signal generator 207 to regulate the received sampling signal Vsample of sampling circuit 205, voltage reference Vref, and on time of output diode Tdis. Regulating signal generator 207 may substantially guarantee that sampling signal Vsample and on time of output diode Tdis are in direct proportion with voltage reference Vref, and are in inverse proportion with switching cycle T, and as a result to generate a regulating signal. This regulating signal may then be supplied to pulse-width modulation (PWM) controller 208.

PWM controlling circuit 208 can generate a controlling signal in accordance with the received regulating signal to control operation of switching device 202 of the LED driver to maintain a substantially constant output current. Here, voltage reference $V_{ref}$ is directly proportional with expected output current $I_0$.

In particular embodiments, the controlling may be operated by direct use of a sampling signal at the primary side of transformer 201, without having to sample and output at the secondary side of transformer 201. In the LED driver example of FIG. 2, which takes advantages of simplified circuit structure, a relatively low cost and more efficient LED driver can be produced.

Figure 3A:
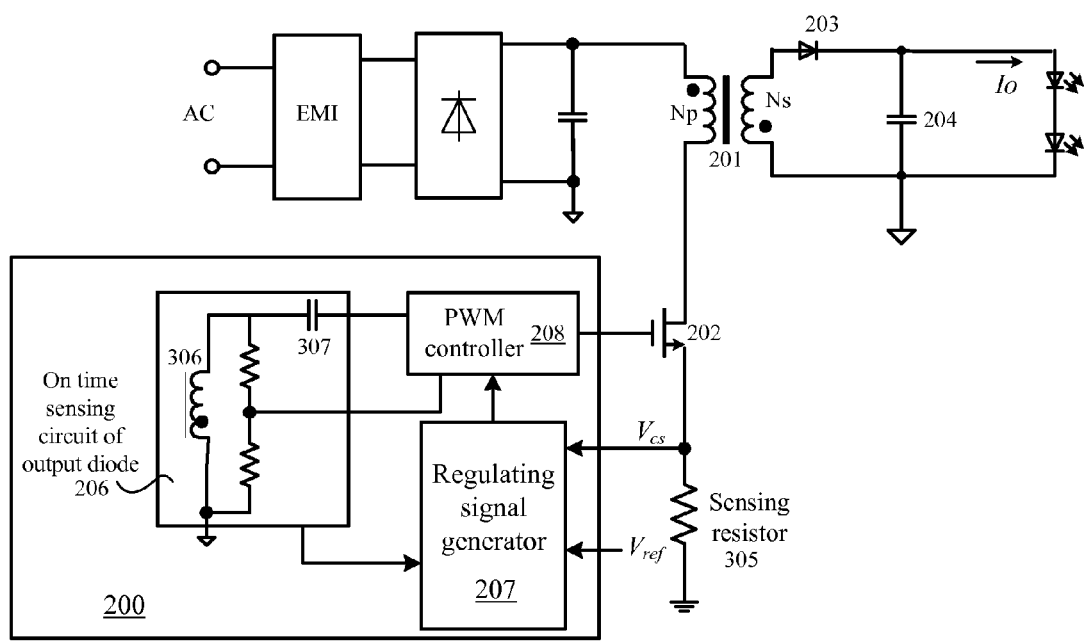
FIG. 3A is a schematic diagram of a second example controlling circuit of an LED driver in accordance with embodiments of the present invention.

Referring now to FIG. 3A, a controlling circuit for an LED driver in accordance with embodiments of the present invention is shown as a flyback topology implementation. In this particular example, sensing resistor 305 can connect in series with switching device 202, for use as the sampling circuit. Sensing voltage Vcs between the two terminals of sensing resistor 305 May be transferred to regulating signal generator 207. Subsidiary winding 306 and differential capacitor 307 can connect in series to form the on time sensing circuit of output diode 206. Subsidiary winding 306 can be used to obtain the current information of secondary winding of transformer 201. In addition, on time of output diode 203 can be achieved by detecting the voltage Vcd of differential capacitor 307.

Figure 3B:
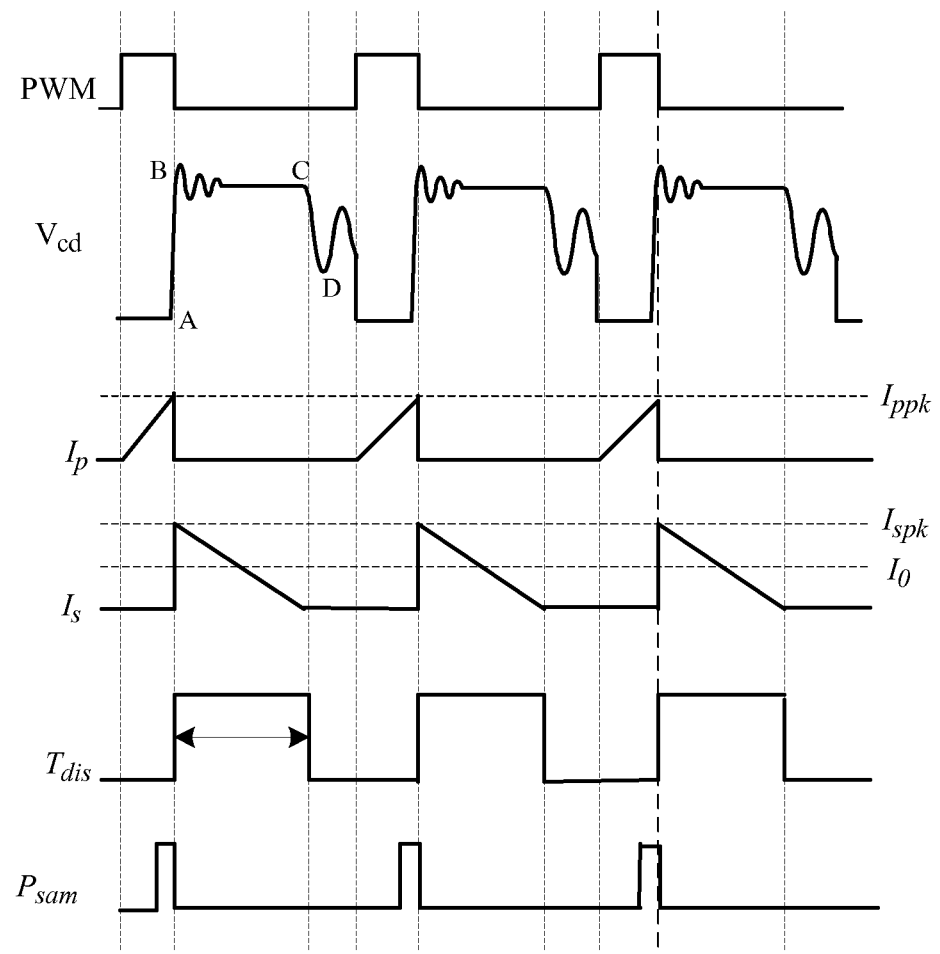
FIG. 3B shows operation waveform examples of the controlling circuit of an LED driver of FIG. 3A.

Referring also to FIG. 3B in conjunction with FIG. 3A, example operation waveforms associated with the LED driver of FIG. 3A are shown. During an on time $T_{on}$ of switching device 202, the input voltage may be supplied to primary winding Np, and current through the primary winding and switching device 202 can increase linearly from zero to peak value Ippk. Energy of input terminal may then be transferred to primary winding Np.

During an off time of switching device 202, energy stored in the primary winding can push output diode 203 to be turned on, and current of output diode 203 may decrease from peak value Ispk to zero linearly during the on time of output diode 203, Tdis. During an off time of switching device 202, current through output diode 203 can be represented on subsidiary winding 306, which can be detected by differential capacitor 306 (see, e.g., waveform labeled Vcd).

When the A to B segment of waveform Vcd is detected, signal Vcd can be the chosen as the rising edge of the on time of output diode Tdis. When the B to C segment of waveform Vcd is detected, signal Vcd can be chosen as the failing edge of the on time of output diode Tdis. In this way, on time Tdis may be achieved as shown.

In accordance with Ampere's Law, and assuming that the turns of the primary side of the transformer are np and turns of the secondary side of the transformer are ns, a relationship between a peak value of output current Ispk and a peak value of primary side Ippk can be as indicated below in Equation 1.

$$I_{spk} = \frac{n_p}{n_s} \cdot I_{ppk} \quad (1)$$

Output current $I_0$ may be equal to and average current of output diode 203 during a switching cycle in a constant output current mode, and output current $I_0$ can be calculated as in Equation 2.

$$I_0 = \frac{1}{2} I_{Spk} \cdot T_{dis} \cdot \frac{1}{T} \quad (2)$$

If parameter Ispk is substituted in Equation 1, output current $I_0$ can be calculated as shown below in Equation 3.

$$I_o = \frac{1}{2} \cdot \frac{n_p}{n_s} \cdot I_{ppk} \cdot \frac{T_{dis}}{T} \quad (3)$$

Here, sensing resistor 305 as sensing circuit may be arranged at the primary side of transformer 201 to detect the peak current value of the primary side of the transformer, Ippk. If the resistance of sensing resistor is Rs and the peak value of the sensing voltage between the two terminals of sensing resistor 305 is Vcspk, the peak current of the primary side of transformer 201 can be calculated as in Equation 4.

$$I_{ppk} = \frac{V_{cspk}}{R_s} \quad (4)$$

In addition, output current $I_0$ can be determined from Equation 5.

$$I_0 = \frac{1}{2} \cdot \frac{n_p}{n_s} \cdot \frac{V_{cspk}}{R_s} \cdot \frac{T_{dis}}{T} \quad (5)$$

If voltage signal $$V_X = \frac{V_{cspk} \cdot T_{dis}}{T}$$

can be fixed on the precondition of fixed turns of primary winding np, fixed turns of secondary winding ns, and fixed sensing resistance Rs, output current Io can be substantially constant. Therefore, the regulations of received sampling signal Vcs of sensing resistor 305, voltage reference Vref, and on time of output diode 203 Tdis, of on time sensing circuit 206 can ensure that voltage signal $$\frac{V_{cpsk} \cdot T_{dis}}{T}$$

maintains a substantially constant value in direct proportion with voltage reference Vref, and may also generate a regulating signal therefrom. Further, sampling signal Vcspk and on time of output diode Tdis may be directly proportional with voltage reference Vref, and inversely proportional with switching cycle T.

The value of voltage reference Vref may be predetermined in accordance with expected output current $I_0$, resistance Rs of sensing resistor 305, turns of both primary winding np, and secondary winding ns following Equation 6.

$$V_{ref} = \frac{2 \cdot I_0 \cdot R_s \cdot n_s}{n_p} \quad (6)$$

From the above Equations 5 and 6, by the predetermination of voltage reference Vref, and regulation of regulating signal generator 207, voltage signal $$\frac{V_{cpsk} \cdot T_{dis}}{T}$$

may be in direct proportion with expected output current $I_0$.

PWM controller 208 can generate a controlling signal in accordance with the received regulating signal to control operation of switching device 202 in order to maintain a substantially constant output current $I_0$ of the LED driver.

In this way, controlling can be operated by direct use of a sampling signal of the primary side of transformer without sampling of the output at the secondary, as shown in the LED driver depicted in FIG. 2. This approach takes advantage of a simplified circuit structure, with lower cost, and higher efficiency of the LED driver.

Figure 4:
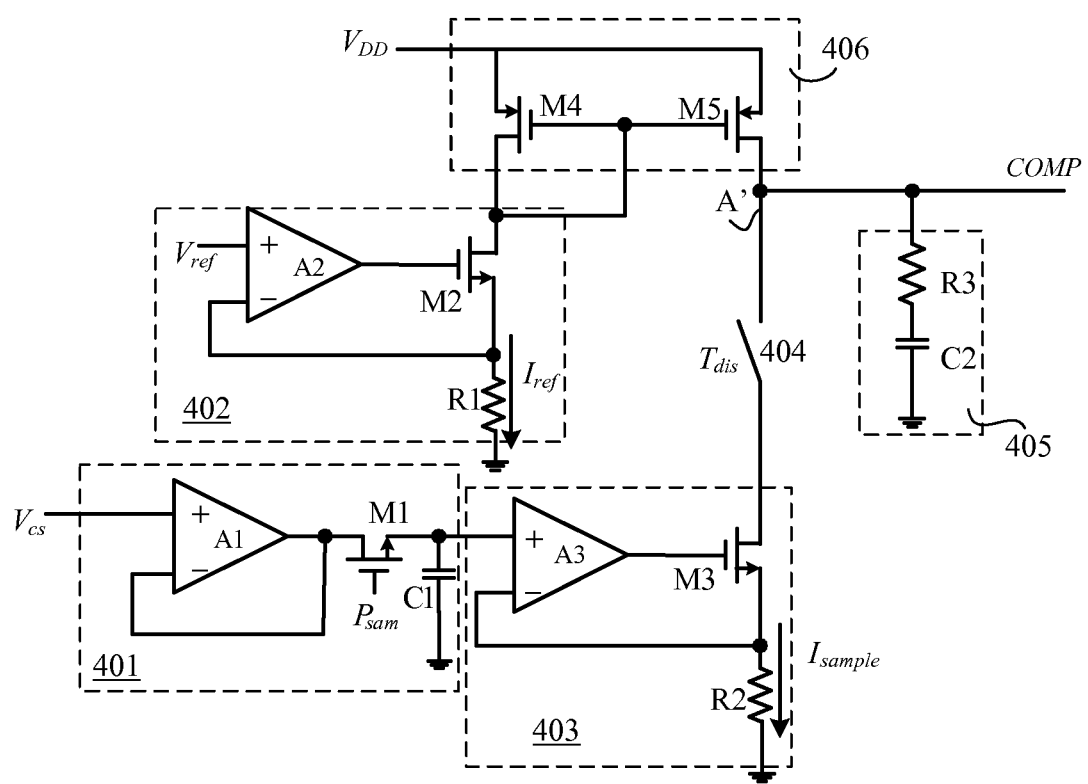
FIG. 4 is a schematic diagram of the first example regulating signal generator of controlling circuit for an LED drive in accordance with embodiments of the present invention.

Referring now to FIG. 4, shown is an example of regulating signal generator 207 of the LED driver discussed above with reference to FIGS. 2 and 3A, and in accordance with embodiments of the present invention. Regulating signal generator 207 can include sampling and holding circuit 401 to receive sensing voltage signal Vcs and to obtain the peak value Vcspk of the sensing voltage signal Vcs. Sampling and holding circuit 401 can include error amplifier A1, switching transistor M1, and sampling and holding capacitor C1.

As shown in FIG. 3B, at the conversion moment from an on status to an off status of switching device 202, or the falling edge of the PWM controlling signal, a single pulse Psam may be generated to control turn on of switching transistor M1. Then, peak value of sensing voltage signal Vcspk can be detected to indicate the maximum current Ispk of output diode 203 and a peak value of primary winding of transformer 201.

Current reference generator 402 can include error amplifier A2, switching transistor M2, and resistor R1. A positive terminal of error amplifier A2 can be coupled to voltage reference Vref, and a negative terminal of error amplifier A2 can be coupled to a common node of resistor R1 and switching transistor M2. The other terminal of resistor R1 can be connected to ground, and an output terminal of error amplifier A2 can be connected to switching transistor M2. Current reference Iref may then be generated through resistor R1, and the value of which can be calculated as in Equation 7.

$$I_{ref} = \frac{V_{ref}}{R_1} \tag{7}$$

Current mirror 406 can be coupled to current reference generator 402 at a first terminal to mirror current reference Iref, and to generate mirroring current at the second terminal.

Sampling current generator 403 can include error amplifier A3, switching transistor M3, and resistor R2. A positive terminal of error amplifier A3 can be coupled to sampling and holding circuit 401 to receive signal Vcspk, while a negative terminal of error amplifier A3 may be coupled to a common node of resistor R2 and switching transistor M3. The other terminal of resistor R2 can be connected to ground, and an output terminal of error amplifier A3 may be coupled to switching transistor M3. Therefore, sensing current Isample can be generated through resistor R2, the value of which can be calculated as below in Equation 8.

$$I_{sample} = \frac{V_{cspk}}{R_2} \tag{8}$$

One terminal of switching transistor 404 may be coupled to an output terminal of current mirror 406, while the other terminal of which may be coupled to an output terminal of sampling current generator 403. In operation, switching transistor 404 can be controlled by an on time of output diode 203, $T_{dis}$.

Compensation circuit 405 can include resistor R3 and capacitor C2 connected in series between common node A' of both switching transistor 404 and current mirror 406, and ground to compensate current of common node A'.

Therefore, Equation 9 can be derived as shown below.

$$\frac{V_{ref} \cdot T}{R_1} - \frac{V_{cspk} \cdot T_{dis}}{R_2} = 0 \tag{9}$$

That is, as shown below in Equation 10.

$$V_{ref} \cdot \frac{R_2}{R_1} = V_{cspk} \cdot \frac{T_{dis}}{T} \tag{10}$$

Thus, voltage signal $$V_{cspk} \cdot \frac{T_{dis}}{T}$$

may be directly proportional with voltage reference Vref. Also, voltage reference Vref can be predetermined as indicated below in Equation 11.

$$V_{ref} = \frac{2 \cdot I_0 \cdot R_s \cdot n_s}{n_p} \tag{11}$$

Here, parameter $I_0$ indicates expected output current of the LED driver, Rs indicates resistance of sensing resistor 305, np indicates turns of primary winding of transformer, and ns indicates turns of secondary winding.

With reference to Equations 10 and 11, a voltage signal can be in direct proportion with voltage reference Vref through the predetermination of voltage reference and regulation of regulating signal generator 207.

PWM controller 208 can be used to generate a controlling signal to control the operation of switching device 202 of the LED driver in accordance with received regulating signal COMP in order to maintain output current I0 as substantially constant.

Figure 5:
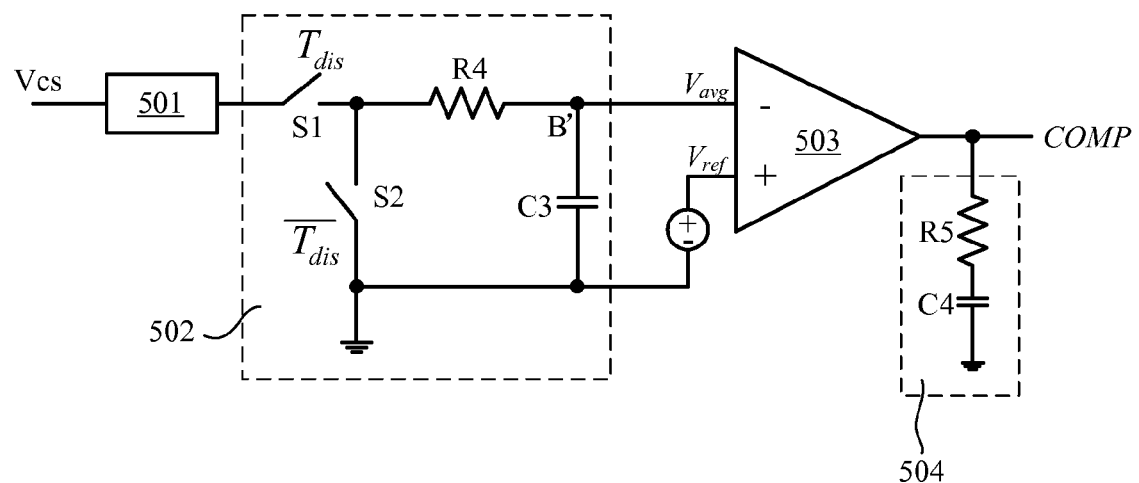
FIG. 5 is a schematic diagram of the second example regulating signal generator of controlling circuit for an LED drive in accordance with embodiments of the present invention.

Referring now to FIG. 5, shown is an example of regulating signal generator 207 as in FIGS. 2 and 3A, and in accordance with embodiments of the present invention. In this example of FIG. 5, regulating signal generator 207 can include sampling and holding circuit 501 to sample and hold received sensing voltage Vcs of resistor 305, in order to obtain a peak value of sensing voltage, Vcspk. The peak value of sensing voltage, Vcspk, can be generated by sampling and holding circuit 401 as discussed above with reference to FIG. 4, or any other suitable type of sampling and holding circuit.

Averaging circuit 502 may average the peak value of sensing voltage Vcspk to obtain an averaging signal Vavg. Averaging circuit 502 can include switch S1, switch S2, resistor R4, and capacitor C3. Switch S1, resistor R4, and capacitor C3 may be connected in series between the output terminal of sampling and holding circuit 501 and ground. One terminal of switch S2 can be connected to a common node of switch S1 and resistor R4.

The operation of switch S1 may be controlled by an on time of output diode 203 to be substantially consistent with an on status of output diode 203. The operation of switch S2 can be controlled by an off time of output diode 203 to be substantially consistent with an off status of output diode 203. The value of the averaging signal Vavg on the common node (B) between resistor R4 and capacitor C3 can be calculated as indicated below in Equation 12.

$$V_{avg} = \frac{V_{cspk} \cdot T_{dis}}{T} \quad (12)$$

Error amplifier 503 may be used to compare the received averaging signal Vavg and the voltage reference Vref. Compensation circuit 504 can include capacitor C4 and resistor R5, and may be used to compensate the output of error amplifier 503, to output the regulating signal COMP.

The operating principle of error amplifier 503 may support Equation 13 as below.

$$V_{ref} = V_{avg} \quad (13)$$

If parameter Vref is substituted into Equation 12, voltage reference Vref can be calculated as indicated below in Equation 14.

$$V_{ref} = V_{cspk} \cdot \frac{T_{dis}}{T} \quad (14)$$

As such, voltage signal $$V_{cspk} \cdot \frac{T_{dis}}{T}$$

can be in direct proportion with voltage reference $V_{ref}$, which may be predetermined in accordance with expected output current $I_0$ of the LED driver, a resistance of sensing resistor 305, turns of primary winding np, and turns of secondary winding ns, consistent with Equation 11 above.

From the preceding Equations 11 and 14, both the predetermination of voltage reference Vref and the regulation of regulating signal generator 207 may carry out a direct proportion between voltage signal $$V_{cspk} \cdot \frac{T_{dis}}{T}$$

and voltage reference $V_{ref}$, and PWM controller 208 may be used to generate a controlling signal to control operation of switching device 202 of the LED driver to maintain a substantially constant output current in accordance with received regulating signal COMP.

Figure 6:
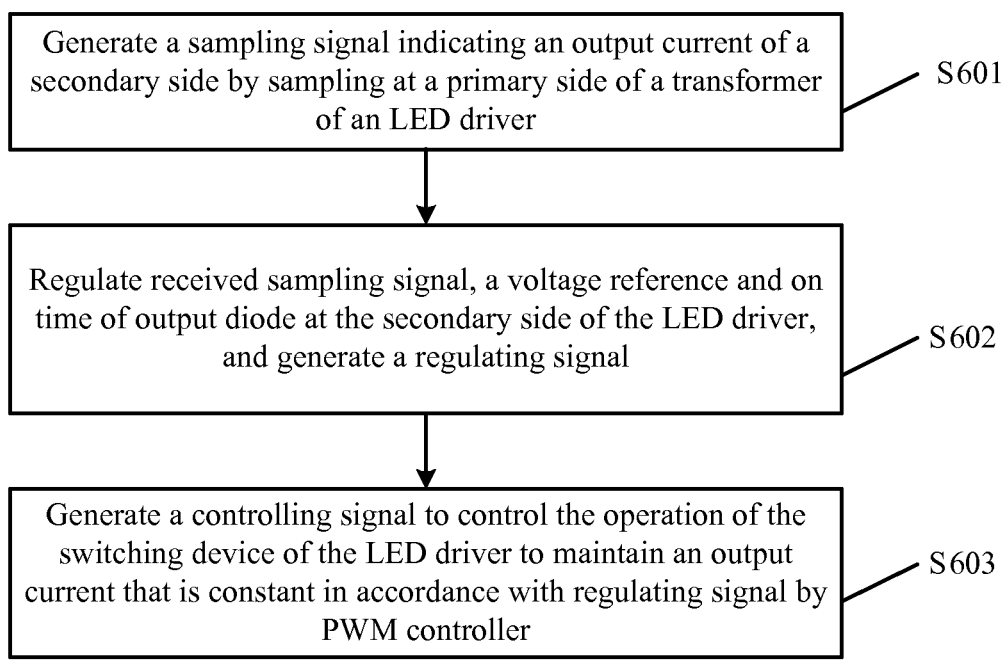
FIGS. 6, 7, and 8 are flow diagrams of example controlling methods for an LED driver in accordance with embodiments of the present invention.

Referring now to FIG. 6, shown is a flow diagram of a first example controlling method for an LED driver in accordance with embodiments of the present invention is shown. At S601, sampling can be performed at the primary side of the transformer of the LED driver to generate a sampling signal indicating an output current at the secondary side.

At S602, the received sampling signal, a voltage reference, and an on time of an output diode at the secondary side of the transformer may be regulated to ensure that the sampling signal and the on time of output diode are directly proportional with voltage reference Vref, and in inverse proportion with the switching cycle to generate a regulating signal, where the voltage reference may be in direct proportion with an expected output current of the LED driver.

At S603, a controlling signal may be generated to control the operation of a switching device of the LED driver to maintain a substantially constant output current in accordance with the regulating signal by the PWM controller.

Figure 7:
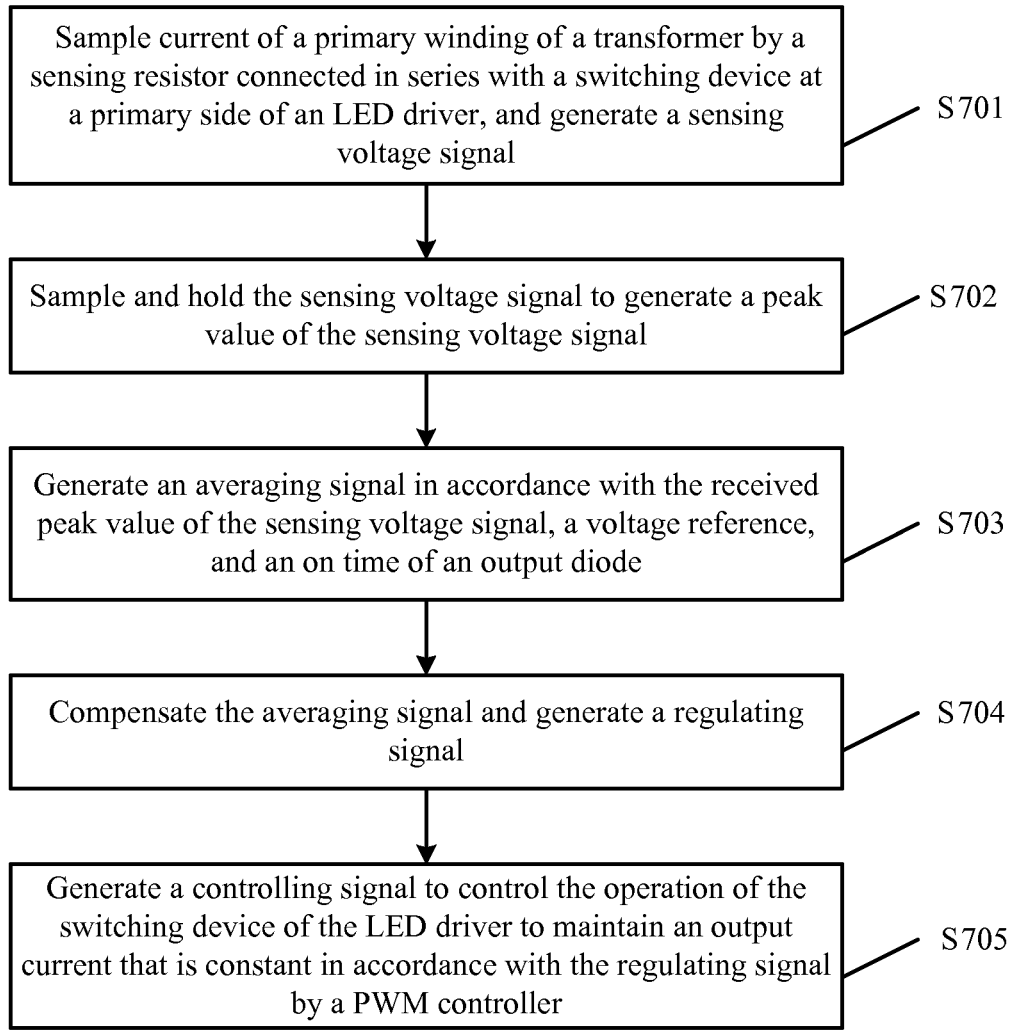

Referring now to FIG. 7, shown is flow diagram of a second example controlling method for an LED driver in accordance with embodiments of the present invention. At S701, a sensing resistor connected in series with a switching device at the primary side of the LED driver may be used to sample the output current of the primary winding, and to generate a sensing voltage signal.

At S702 the sensing voltage signal may be sampled and held to generate a peak value of the sensing voltage signal. At S703, an averaging signal may be generated in accordance with the received peak value of the sensing voltage signal, a voltage reference, and an on time of output diode. At S704, the averaging signal may be compensated to generate a regulating signal.

Figure 8:
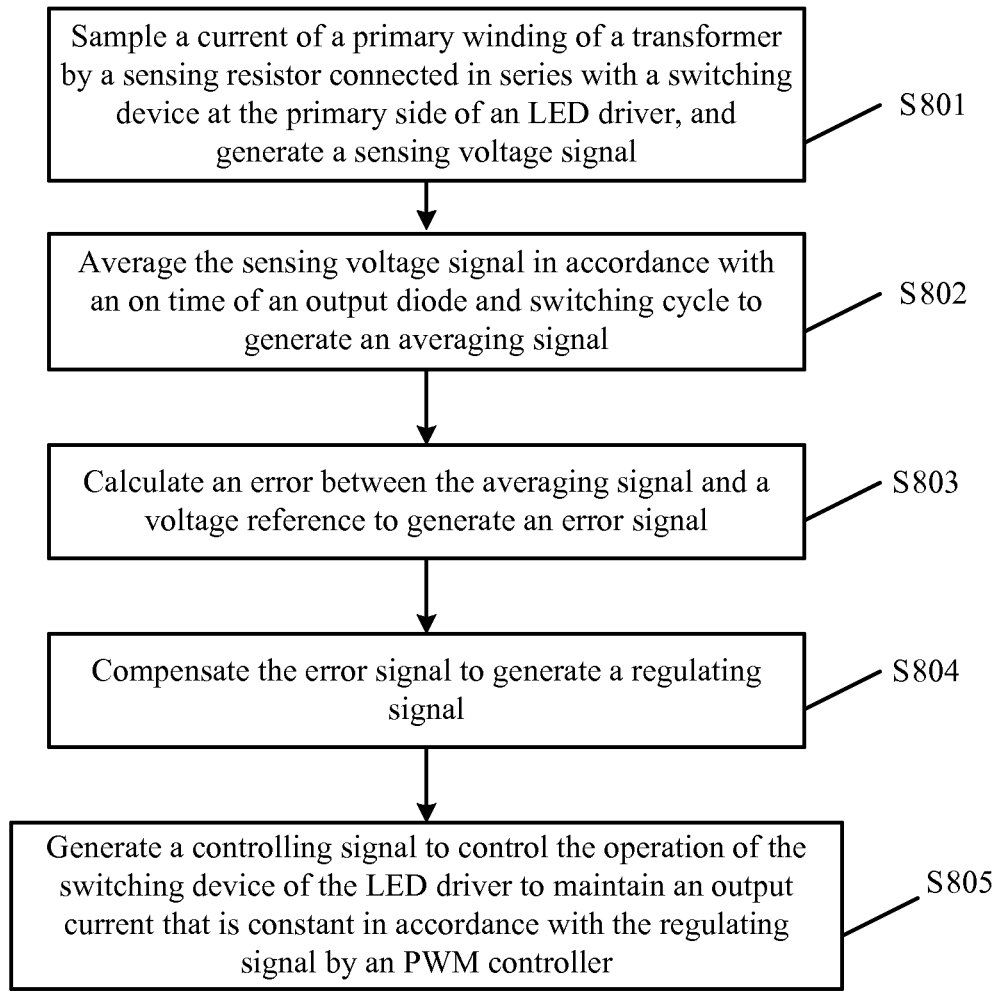

At S705, a controlling signal may be generated to control the operation of a switching device of the LED driver in accordance with the regulating signal by the PWM controller. For example, generation of an averaging signal can include generating a current voltage in accordance with the voltage reference, generating a peak value of sampling current in accordance with the sensing voltage signal, generating the averaging signal in accordance with the received peak value of sensing current, the current reference, and on time of output diode Referring now to FIG. 8, shown is a flow diagram of a third example controlling method for an LED driver in accordance with embodiments of the present invention. At S801, a sensing resistor connected in series with a switching device at the primary side of LED driver may be used to sample the output current of the primary winding, and to generate a sensing voltage signal.

At S802, the sensing voltage signal may be averaged to generate an averaging signal in accordance with the switching cycle and on time of the output diode. At S803, the error between the averaging signal and a voltage reference may be calculated to generate an error signal. At S804, the error signal may be compensated to generate a regulating signal.

At S805, a controlling signal may be generated to control the operation of the switching device of the LED driver to maintain a substantially constant output current in accordance with the regulating signal by the PWM controller. The voltage reference may be in direct proportion with an expected output current, a resistance of sensing resistor, and turns of primary winding, and in inverse proportion with the turns of primary winding. Also, the averaging signal may be in direct proportion with the sensing voltage and an on time of output diode, and inversely proportional with the switching cycle.

In this fashion, LED driver controlling can be performed by direct use of a sampling signal of the primary side of the transformer without sampling of the output at the secondary side of the transformer. Thus, provided is a controlling circuit and controlling method for an LED driver, which takes advantages of substantially constant and stable output current, simplified circuit structure, lower cost and improved efficiency LED driver.

Figure 9:
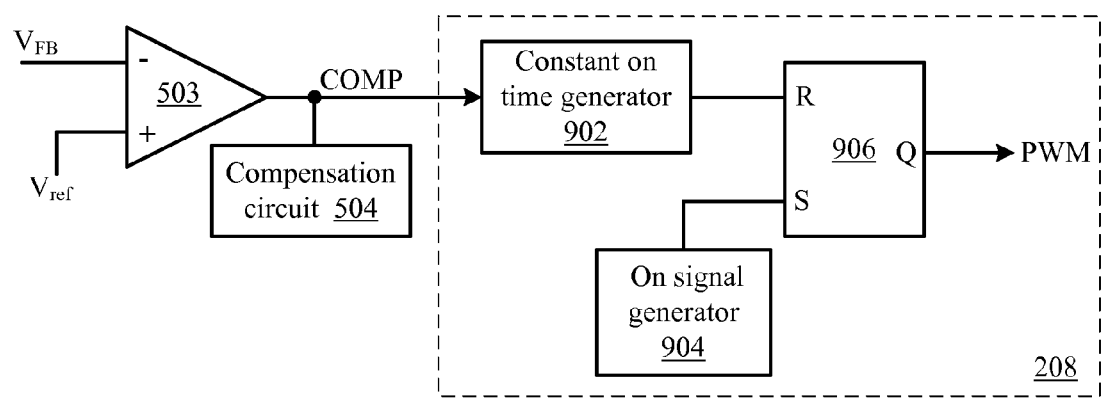
FIG. 9 is a schematic block diagram of an example PWM controller in accordance with embodiments of the present invention.

Referring now to FIG. 9, shown is a schematic block diagram of an example

PWM controller in accordance with embodiments of the present invention. For example, PWM controller 208 as shown in FIG. 2 can be indicated in the box in FIG. 9. Regulating signal COMP can be input to PWM controller 208, and can be the output signal as shown above in FIGS. 4 and 5. In FIG. 9, amplifier 503 and compensation circuit 504 of FIG. 5 are shown to facilitate the description. In this particular example, amplifier 503 (e.g., an operational transconductance amplifier) can be configured to generate an error signal between a feedback signal (e.g., average signal $V_{avg}$ of FIG. 5) and voltage reference $V_{ref}$.

Compensation circuit 504 can be configured to compensate the error signal, and to generate regulating signal COMP, and can be any suitable configuration circuit (e.g., capacitor, capacitor and resistor coupled in series, capacitor and resistor coupled in parallel, etc.). One example of such compensation circuit 504 is shown in FIG. 5. In PWM controller 208, constant on time generator 902 can be configured to generate a constant on time signal, the duration of which can be controlled by regulating signal COMP to control, e.g., the off operation of the main power switch (e.g., switching device 202 of FIG. 2). For example, on signal generator 904 can be configured to generate an on signal to control the on operation or state of the main power switch. RS flip-flop 906 can be coupled to constant on time generator 902, and to on signal generator 904, to receive the constant on time signal and the off control signal, and to generate a PWM control signal. For example, the PWM control signal can control (e.g., via the gate thereof) the main power switch (e.g., 202).

For flyback topologies operating in a boundary conduction mode (BCM) or discontinuous current mode (DCM) mode, the inductor current can be presented as below in Equation 15.

$$i_{pk} = \frac{V_{in}}{L} \times t_{on} \quad (15)$$

Here, $i_{pk}$ can represent a peak value of the inductor current flowing through the primary winding of the transformer (e.g., transformer 201), $V_{in}$ can represent the input voltage, $t_{on}$ can represent the on time of the main power switch (e.g., switching device 202 of FIG. 2), and L can represent the inductance of the primary winding of the transformer. When on time $t_{on}$ is constant, because L is also constant, the peak value of inductor current $i_{pk}$ can be in direct proportion with input voltage $V_{in}$. As shown in the example of operation waveforms of FIG. 10, the envelope line of the peak value can be depicted as a sinusoidal wave. Therefore, the waveform of the input current $i_{IN}$ may also be represented as a sinusoidal wave that follows input voltage $V_{in}$. In this way, power factor correction can be achieved to obtain a high power factor for the implementation as shown in FIG. 2, as compared to conventional approaches.

In the example of FIG. 9, in order to maintain on time $t_{on}$ constant, operational amplifier 503 may have a relatively wide linear range (e.g., from about −200% to about +250%, such as from about −100% to about +150%). When the output current is close to (e.g., within a predetermined amount) or is otherwise consistent with the expected output current, regulating signal COMP may be maintained as substantially constant, and on time $t_{on}$ can be substantially constant. When the output current is relatively far away from the expected output current, regulating signal COMP may begin to regulate the on time until the output current recovers to the expected output current, and then on time $t_{on}$ can again be maintained as substantially constant. Through this regulation, both power factor correction and constant output current regulation can be achieved in particular embodiments.

Figure 10:
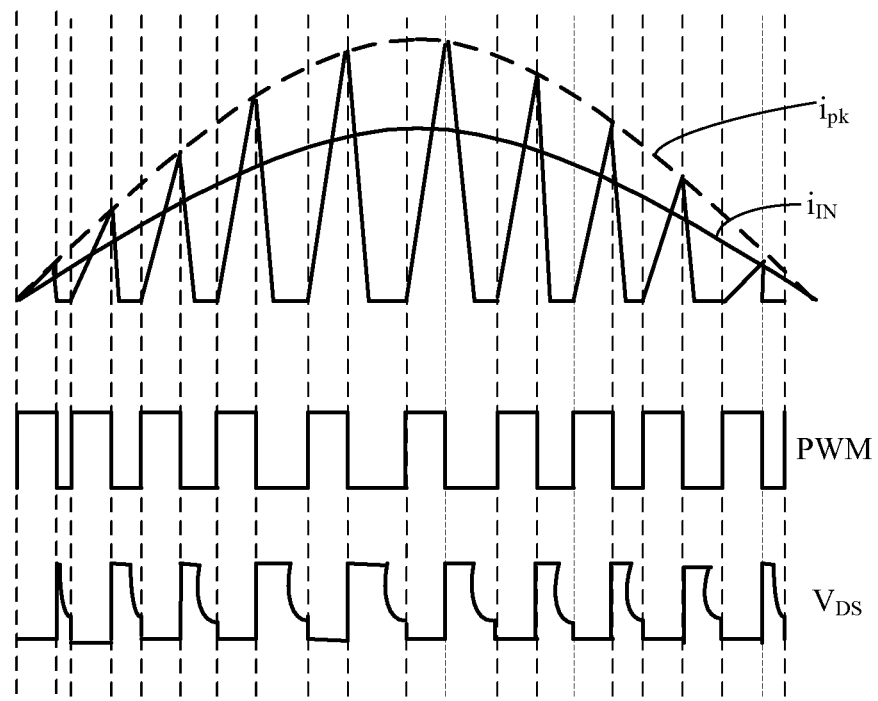
FIG. 10 is a waveform diagram of an example quasi-resonance control mode, in accordance with embodiments of the present invention.

Furthermore, on signal generator 904 can be configured in a quasi-resonance control mode or valley current control mode, or any other suitable operating modes to control the on operation of the main power switch. As shown in FIG. 10, when the voltage between the first power terminal and the second power terminal of the main power switch (e.g., drain-to-source voltage $V_{DS}$ when the main power switch configured as an N-type MOSFET transistor) reaches a level of a valley or low/minimum value, the PWM control signal can go high to turn on the main power switch. Any suitable circuit implementation or configuration can be utilized to achieve quasi-resonance control.

Figure 11:
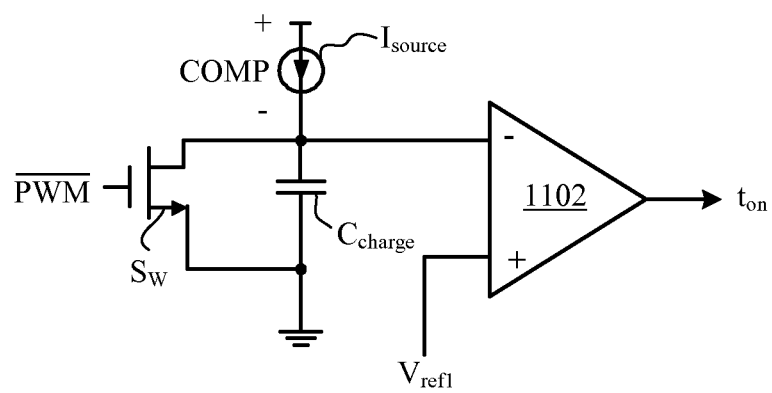
FIG. 11 is a schematic block diagram of an example constant on time generator in accordance with embodiments of the present invention.

Referring now to FIG. 11, shown is a schematic block diagram of an example constant on time generator in accordance with embodiments of the present invention. This particular example constant on time generator can include voltage-controlled current source $I_{source}$ and capacitor $C_{charge}$ coupled in series, switch $S_W$ coupled in parallel with capacitor $C_{charge}$, and comparator 1102 that receives comparison voltage reference $V_{ref1}$ and a signal at a common node of voltage controlled current source $I_{source}$ and capacitor $C_{charge}$. For example, a current of current source $I_{source}$ can be controlled by regulating signal COMP. Also, operation of switch $S_W$ can thus be opposite to that of the main power switch, and switch $S_W$ can be controlled by inverting the PWM control signal.

When the main power switch is turned on via the PWM control signal (and switch $S_W$ is off), capacitor $C_{charge}$ can be charged by current source $I_{source}$. The voltage across capacitor $C_{charge}$ can increase linearly and continuously, until the voltage across capacitor $C_{charge}$ reaches a level of voltage reference $V_{ref1}$. As a result, the PWM control signal can go low to turn off the main power switch (e.g., switching device 202). Correspondingly, switch $S_W$ can be on and capacitor $C_{charge}$ can be discharged to ground through the turned-on switch $S_W$. Also, the output signal of comparator 1102 can be configured as the on time control signal.

In particular embodiments, because amplifier 503 may have a substantially wide linear range, the output signal of amplifier 503 can be utilized to achieve both constant on time and constant current regulation. In a certain range, regulating signal COMP can be constant, and the on time can be constant as a result. Also, when the output current is relatively far away from an expected output current, the on time can be regulated to correct and bring the output current back in line with the expected output current. In addition, a constant on time controlling mode can be utilized to achieve both power factor correction and constant output current regulation.

The foregoing descriptions of specific embodiments of the present invention have been presented through images and text for purpose of illustration and description of the LED driver controller circuit and method. They are not intended to be exhaustive or to limit the invention to the precise forms disclosed, and obviously many modifications and variations are possible in light of the above teaching, such as the alternatives of the type of switching device, on time sensing circuit of output diode, controlling of switching device and sampling and holding circuit for different applications.

The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A controlling circuit for a light-emitting diode (LED) driver having a transformer, said controlling circuit comprising:
   a) a sampling circuit configured to generate a sampling signal that indicates an output current signal of said LED driver at a primary side of said transformer;
   b) an on time sensing circuit configured to sense an on time of an output diode arranged at a secondary side of said transformer;
   c) a regulating signal generator configured to generate a regulating signal based on said sampling signal, a voltage reference that is directly proportional to an expected output current of said LED driver, and said on time of said output diode, wherein said regulating signal generator comprises an operational amplifier; and
   d) a pulse-width modulation (PWM) controller configured to generate a controlling signal to control operation of a switching device of said LED driver based on said regulating signal, and wherein an on time of said switching device is controlled by said regulating signal.

2. The controlling circuit of claim 1, wherein said operational amplifier comprises a linear range from about −200% to about +250%.

3. The controlling circuit of claim 1, wherein aid operational amplifier comprises a linear range from about −100% to about +150%.

4. The controlling circuit of claim 1, wherein said on time of said switching device is controlled to be constant by said regulating signal to achieve power factor correction.

5. The controlling circuit of claim 1, wherein said sampling circuit comprises:
   a) a sensing resistor coupled in series with said switching device at said primary side of said transformer, configured to convert current flowing through said primary side of said transformer to a sensing voltage signal; and
   b) a sampling and holding circuit configured to generate a peak value of said sensing voltage signal.

6. The controlling circuit of claim 1, wherein said regulating signal generator comprises:
   a) said operational amplifier configured to generate an output signal that represents an error between said voltage reference and an averaging signal, wherein said output signal is configured for constant on time and constant current regulation; and
   b) a compensation circuit configured to generate said regulating signal based on said output signal of said operational amplifier.

7. The controlling circuit of claim 6, wherein said averaging signal is in direct proportion with said on time of said output diode and said peak value of sensing voltage signal, and in inverse proportion with a switching cycle of said switching device.

8. The controlling circuit of claim 6, wherein said averaging circuit comprises:
   a) a first switch having a first terminal coupled to receive said peak value of said sensing voltage signal, and a second terminal coupled to a first terminal of a resistor and a first terminal of a second switch, wherein a second terminal of said second switch is coupled to ground; and
   b) a capacitor having a first terminal coupled to a second terminal of said resistor and an average node, and a second terminal coupled to ground,
   c) wherein said first switch is configured to be turned on when said output diode is on, and said second switch is configured to be turned off when said output diode is off.

9. The controlling circuit of claim 1, wherein said regulating signal generator comprises an averaging circuit configured to average said peak value of said sensing voltage signal in accordance with said on time of said output diode, and to generate an averaging signal.

10. The controlling circuit of claim 1, wherein when a product of said sampling signal and said on time of said output diode is in direct proportion with a product of said voltage reference and a switching cycle of said switching device, an output current of said LED driver is consistent with said expected output current.

11. The controlling circuit of claim 1, wherein said voltage reference is directly proportional to a ratio of a product of said expected output current and turns of a secondary winding of said transformer, and turns of a primary winding of said transformer.

12. The controlling circuit of claim 1, wherein said PWM controller comprises:
   a) a constant on time generator configured to generate an on time signal in accordance with said regulating signal;
   b) an on signal generator configured to generate an on control signal to turn on said switching device; and
   c) an RS flip-flop configured to be set by an output from said on signal generator, and to be reset by an output from said constant on time generator, wherein an output of said RS flip-flop is configured as said controlling signal.

13. The controlling circuit of claim 12, wherein said on signal generator is configured to achieve a quasi-resonant control mode.

14. The controlling circuit of claim 13, wherein when a voltage between a first power terminal and a second power terminal of said switching device reaches a level of a valley value, said switching device is configured to be turned on.

15. The controlling circuit of claim 12, wherein said constant on time generator comprises:
   a) a current source having a current controlled by said regulating signal;
   b) a capacitor coupled in series with said current source;
   c) an on control switch coupled in parallel with said capacitor, wherein an on and off state of said on control switch is inverted with said switching device; and
   d) a comparator configured to receive a comparison voltage reference and a voltage across said capacitor is configured to generate said on time signal.

16. A method of controlling a light-emitting diode (LED) driver configured in a flyback topology, the method comprising:
   a) generating a sensing voltage signal by sampling current flowing through a primary side of a transformer of said LED driver;
   b) determining a peak value of said sensing voltage signal by sampling and holding said sensing voltage signal;
   c) generating, by an operational amplifier, a regulating signal based on said peak value of said sensing voltage signal, a voltage reference, and an on time of an output diode of said LED driver; and
   d) generating a controlling signal based on said regulating signal to control operation of a switching device of said LED driver, wherein an on time of said switching device is controlled by said regulating signal.

17. The method of claim 16, wherein said generating said regulating signal comprises:
- a) generating an averaging signal by averaging a peak value of said sensing voltage signal in accordance with an on time of an output diode and a switching cycle;
- b) generating an error signal representing an error between said averaging signal and said voltage reference; and
- c) generating a regulating signal by compensating said error signal.

18. The method of claim 17, wherein said averaging signal is in direct proportion with said on time of said output diode and said peak value of said sensing voltage signal, and in inverse proportion with said switching cycle.

19. The method of claim 16, wherein when a product of a sampling signal and said on time of said output diode is in direct proportion with a product of said voltage reference and a switching cycle of said switching device, and an output current of said LED driver is consistent with said expected output current.

20. The method of claim 16, wherein:
- a) said voltage reference is directly proportional to a ratio of a product of said output current and turns of a secondary winding of said transformer, and turns of a primary winding of said transformer;
- b) said on time of said switching device is controlled to be constant by said regulating signal to achieve power factor correction; and
- c) said switching device is controlled to operate in a quasi-resonant control mode.

* * * * *